DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 24, 1970

872 O.G. 1051

T872,006

MANEB FORMULATIONS INCLUDING POLYETHOXYALKANOL PHOSPHATES

Christian Benjamin Luginbuhl, 127 Nevada Ave., Shipley Heights, Wilmington, Del. 19803

Continuation-in-part of application Ser. No. 639,288, May 18, 1967. This application Aug. 19, 1969, Ser. No. 851,494

Int. Cl. A01n *9/12*

U.S. Cl. 424—286

No Drawing. 13 Pages Specification

A fungicidal spray composition suitable for spraying is made by adding to a maneb wettable powder, hydrocarbon spray oil, emulsifier and water formulation, a polyethoxyalkanol phosphate as an anti-foam agent. The preferred anti-foaming agent is the reaction product of ethoxylated tridecyl alcohol with $P_2O_5$.